June 30, 1970 D. F. WILLMANN 3,517,567

GEAR SUPPORT AND ALIGNMENT GUIDE

Filed Jan. 23, 1969

INVENTOR.
DONALD F. WILLMANN
BY
Charles M. Hogan
ATTORNEY.

3,517,567
    GEAR SUPPORT AND ALIGNMENT GUIDE
Donald F. Willmann, Cincinnati, Ohio, assignor to Avco
  Corporation, Cincinnati, Ohio, a corporation of Delaware
         Filed Jan. 23, 1969, Ser. No. 793,510
         Int. Cl. F16h 1/06, 57/04; F16c 27/00
U.S. Cl. 74—414                                    9 Claims

ABSTRACT OF THE DISCLOSURE

The invention is a gear support constructed of a single supporting plate and a single bearing in which each gear is journaled, with self-lubricating guides appropriately spaced on said support at the gear peripheries to support and align the mating gear faces.

---

The present invention relates to gear train supports and is particularly concerned with an effective and inexpensive gear train support permitting the gears to rotate accurately in intermeshed relationship. The invention utilizes a single supporting plate for mounting the bearings in which the shafts of the gears are journaled with appropriate guides spaced in predetermined relationship upon said support for supporting and accurately aligning the mating gear faces. The gear support of the invention can be utilized in numerous types of devices requiring gear trains, such as communication equipment, timers, clocks and toys.

The manufacture of gear trains has traditionally involved a series of operations including the provision of a pair of plates, spacing them an appropriate distance apart and mounting a number of gears in aligned openings in such plates. Problems of manufacturing become increasingly acute as the gear faces become thinner. According to the invention an accurately aligned gear train can be constructed upon a single plate, the thinness of the gear body is not critical and numerous manufacturing cost savings can be effected.

Figure 1:
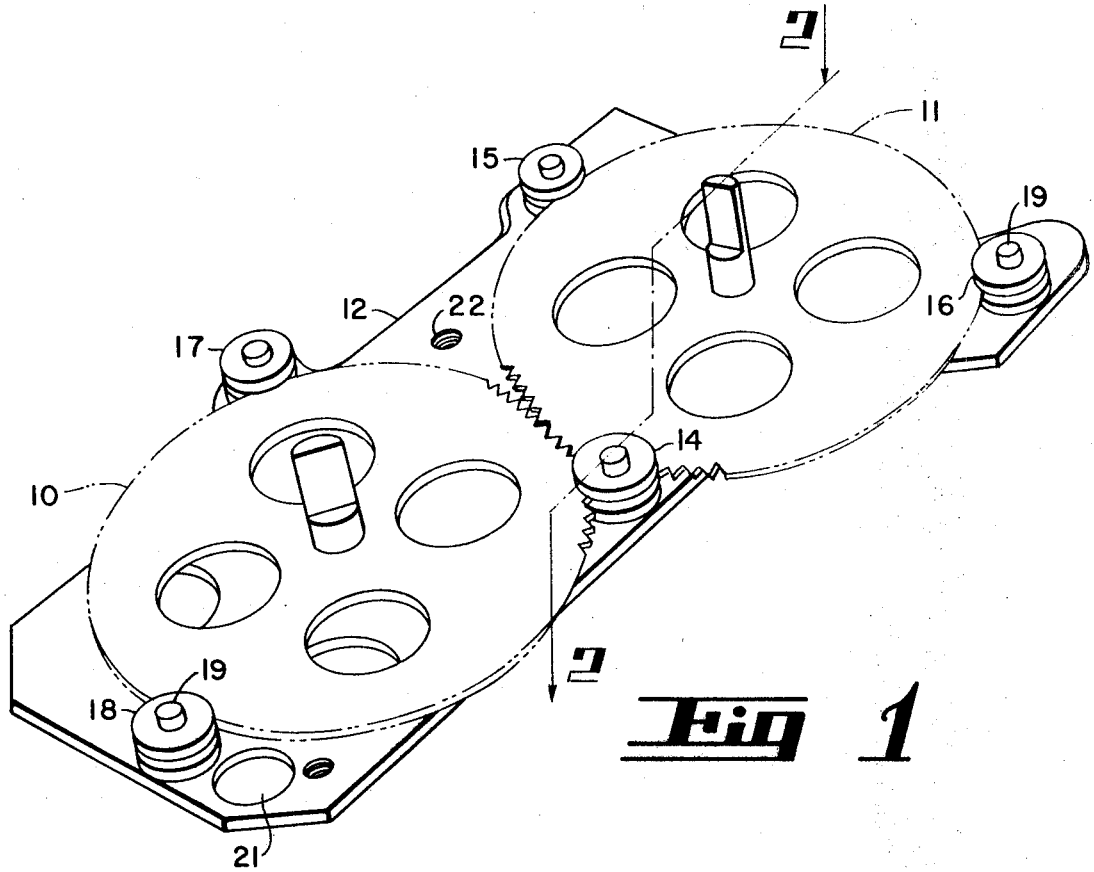
Figure 2:
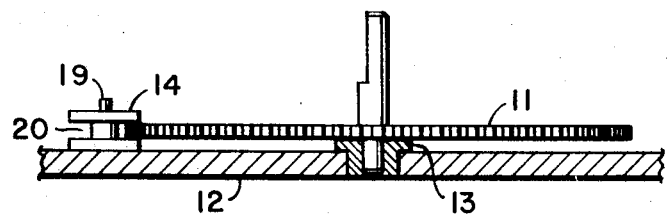

An embodiment of the invention is shown in perspective in FIG. 1. FIG. 2 is a fragmentary section taken along line 2—2 of FIG. 1.

A gear train consisting of gears 10, 11 is mounted on a single plate 12, the gears being journaled in bearings 13 secured in plate 12. Gear guides 14, 15, 16, 17 and 18 are secured to the plate 12 at spaced intervals adjacent the periphery of gears 10, 11, preferably 120 degrees apart. The guide 14 is advantageously placed adjacent the bight of the gears to properly align the mating gear surfaces. The guides 14–18 may be pulleylike in configuration but they are preferably non-rotatable; they simply support the gear faces in alignment and prevent them from wobbling. The guides may be threaded internally and held in place by studs 19 extending through openings (not shown) in the distal side of the plate, the heads of the studs being turned up firmly to hold the guides securely in position against the top of the plate, as shown in FIG. 1.

It will be noted that the double plate construction conventionally employed in gear train manufacture is not employed nor is it necessary to provide spacers between plates, aligned holes for the gear shafts or means for pinning the gears to their shafts. The simple guides 14–18 replace parts previously believed necessary and expensive fabrication operations are avoided.

An important part of the invention is the selection of the material used for the guides 14–18. Such material should be self-lubricating at least to the extent of permitting the teeth of the gear to slide easily through the annular spaces 20 between the upper and lower surfaces of the guides. I have found that bronze-filled fluorocarbon resin of the type sold by the E. I. du Pont de Nemours Company of Wilmington, Del. under the trademark "Teflon," type FEP, to be highly satisfactory for the purposes of the invention. This exhibits very high load-velocity capability, known in the art as PV capability and very low wear factors and coefficient of friction.

The plate 12 may be provided with cutouts 21 to lesson its weight and with tapped and threaded openings 22 to receive studs for supporting the plate on the equipment for which the gearing is used.

Although I have found that bronze-filled fluorocarbon resins are very effective for gear guides according to the invention, other filled compositions comprising any mixture of fluorocarbon resins with discrete organic or inorganic particles or fibers can be used. The important factor concerns the use of self-lubricating guide materials whose coefficient of a rubbing friction is low. Use of low friction coefficient materials minimizes both the wear rate and torque losses attributable to running friction.

As will be noted from the above, highly efficient and satisfactory gear trains can be constructed in accordance with the invention at considerable savings in manufacturing cost and weight (where weight factors are important as in aeronautic equipment) and with a significant saving in maintenance and service.

Having described my invention, I claim:

1. A gear support comprising, in combination:
   a plate;
   bearings supported in said plate;
   gears journaled in said bearings with their faces parallel to said plate; and
   guide means secured to said plate engaging the sides of said gears at the periphery thereof.

2. A gear support according to claim 1, said plate and guide means comprising the sole support for said gears.

3. A gear support according to claim 1 in which the guide means are non-rotatably secured to said plate.

4. A gear support according to claim 1 in which said guide means are spaced 120 degrees apart at the periphery of said gears.

5. A gear support according to claim 1 in which said guide means are constructed of a self-lubricating material having a high load-velocity capability, low wear characteristics and a low coefficient of friction.

6. A gear support according to claim 5 in which one of said guides is located at the bight between said gears.

7. A gear support according to claim 6 in which said plate and guides comprise the sole means for supporting said gears in operating relationship.

8. A gear support according to claim 1 in which said guide means are constructed of bronze-filled fluorocarbon resin.

9. A gear support according to claim 1 in which said guide means are pulleylike in contour and have edges overlapping the faces of the gears for supporting them in operative alignment.

References Cited

UNITED STATES PATENTS

| 2,976,093 | 3/1961 | Reiling | 308—238 |
| 2,998,397 | 8/1961 | Reising | 260—17 |
| 3,069,178 | 12/1962 | Rosen | 277—112 |

LEONARD H. GERIN, Primary Examiner

U.S. Cl. X.R.

74—467; 308—238